US010142131B2

(12) United States Patent
Rootsey et al.

(10) Patent No.: US 10,142,131 B2
(45) Date of Patent: Nov. 27, 2018

(54) INTELLIGENT SHORTWAVE FREQUENCY MANAGEMENT SYSTEMS AND ASSOCIATED METHODS

(71) Applicant: HySky Technologies, Inc., Savannah, GA (US)

(72) Inventors: James V. Rootsey, Melbourne, FL (US); Charles C. Maynard, Savannah, GA (US); Phillip L. Galpin, Omaha, NE (US)

(73) Assignee: HYSKY TECHNOLOGIES, INC., Savannah, GA (US)

( * ) Notice: Subject to any disclaimer, the term of this patent is extended or adjusted under 35 U.S.C. 154(b) by 0 days.

(21) Appl. No.: 15/896,287

(22) Filed: Feb. 14, 2018

(65) Prior Publication Data
US 2018/0234267 A1    Aug. 16, 2018

Related U.S. Application Data

(60) Provisional application No. 62/458,962, filed on Feb. 14, 2017.

(51) Int. Cl.
*H04B 1/18* (2006.01)
*H04L 25/02* (2006.01)
(Continued)

(52) U.S. Cl.
CPC ......... *H04L 25/0206* (2013.01); *H04W 16/10* (2013.01); *H04W 24/10* (2013.01); *H04W 64/003* (2013.01); *H04W 72/0453* (2013.01)

(58) Field of Classification Search
CPC .. H04L 25/0206; H04W 16/10; H04W 24/10; H04W 64/003; H04W 72/0453
(Continued)

(56) References Cited

U.S. PATENT DOCUMENTS

| 4,853,686 A | 8/1989 | Kueng et al. |
| 5,589,844 A | 12/1996 | Belcher et al. |

(Continued)

FOREIGN PATENT DOCUMENTS

| CN | 104093193 | 10/2014 |
| WO | 2016073611 | 5/2016 |
| WO | 2017155634 | 9/2017 |

OTHER PUBLICATIONS

Scholz, Marcel L. and Stimson, Philip A., MILCOM 97 Proceedings, Load Shedding, Routing and Frequency Selection Algorithms for High Frequency Hub Networks, Nov. 3-5, 1997, Communs. Div., Defence Sci. & Technol. Organ., Salisbury, SA, Australia.

(Continued)

*Primary Examiner* — Sanh D Phu
(74) *Attorney, Agent, or Firm* — Hogan Lovells US LLP (57) ABSTRACT

The present disclosure includes embodiments of a two-way wireless data communication system and associated methods. An embodiment of a system can include a network operations center (NOC), a plurality of fixed-location receive base stations (RBS) in communications with the NOC, and an intelligent shortwave communication network in communications with the NOC and the plurality of RBS and including a plurality of remote intelligent transceiver units (ITU). In an embodiment, for example, the NOC can be operative to a) compute rapidly a protocol under which nationwide communications is to be completed via coordinated operations of the linked ITU and RBS, b) determine propagating and clear electromagnetic wavelengths over an entire 3 MHz to 30 MHz shortwave band, and c) send a continuous stream of data indicating times and frequencies at which remote units can rapidly and efficiently transmit data and at which antenna sites can reliably and efficiently receive that data.

20 Claims, 7 Drawing Sheets

(51) Int. Cl.
*H04W 72/04* (2009.01)
*H04W 16/10* (2009.01)
*H04W 64/00* (2009.01)
*H04W 24/10* (2009.01)

(58) Field of Classification Search
USPC .................................................. 455/179.1
See application file for complete search history.

(56) References Cited

U.S. PATENT DOCUMENTS

| | | | | |
|---|---|---|---|---|
| 5,640,442 | A | * | 6/1997 | Fitzgerald ........... H04W 72/085 340/7.21 |
| 5,734,963 | A | | 3/1998 | Fitzgerald et al. |
| 5,765,112 | A | | 6/1998 | Fitzgerald et al. |
| 5,884,184 | A | * | 3/1999 | Sheffer ................ H04W 24/10 340/3.1 |
| 5,995,804 | A | | 11/1999 | Rootsey et al. |
| 6,075,496 | A | | 6/2000 | Harriman |
| 9,456,402 | B2 | | 9/2016 | Linden et al. |
| 2007/0060065 | A1 | * | 3/2007 | Kruys ..................... G01S 7/021 455/67.11 |
| 2010/0255801 | A1 | * | 10/2010 | Gunasekara .......... H04W 16/14 455/188.2 |
| 2011/0142110 | A1 | | 6/2011 | Schwager |
| 2012/0238267 | A1 | * | 9/2012 | Kim ................... H04L 27/0006 455/434 |
| 2016/0173360 | A1 | | 6/2016 | Goldin et al. |

OTHER PUBLICATIONS

Jordan, Ramiro and Abdallah, Chaouki T., IEEE Antennas and Propagation Magazine, vol. 44, No. 1, Wireless Communications and Networking: An Overview, Feb. 1, 2002, Dept. of Electr. & Comput. Eng., The University of Mexico.

International Search Report and Written Opinion for PCT/US18/18111, dated May 2, 2018.

* cited by examiner

INTELLIGENT SHORTWAVE FREQUENCY MANAGEMENT SYSTEMS AND ASSOCIATED METHODS

CROSS-REFERENCE TO RELATED APPLICATIONS

This application is related to, and claims the benefit of, U.S. Provisional Application No. 62/458,962, filed Feb. 14, 2017, titled "Intelligent Shortwave Frequency Management Systems and Associated Methods," which is incorporated herein by reference in its entirety.

FIELD ON INVENTION

This invention relates generally to wireless communication systems and associated methods and, in particular, to more efficient wide area data communications networks.

BACKGROUND

In today's world, unfortunately, existing and even certain proposed wireless communications network systems costing many millions of dollars have failings of one type or another. Consider, for example, existing wireless wide area data networks which support communication between a remote or mobile field unit and a base station. These networks either use terrestrial or satellite-deployed base stations. Terrestrial systems can be further classified as either one-way or two-way. Some terrestrial and satellite systems that cost less allow remote users to receive data but provide poor or no capability for remote users to send data. Although some systems support two-way data transfer, these typically provide only limited geographic coverage, which is related to the coverage radius of their transmission towers. In addition, such networks also typically exhibit relatively poor penetration of building structures, due to the high carrier frequencies at which they operate.

Other existing and proposed two-way terrestrial commercial systems include cellular networks and mobile data networks that, do not, by design, cover the entire continental United States. It is estimated that over 40% of the United States does not have commercial wireless data service. Many remote privately owned assets are in these areas and need to be economically monitored. The data rates of these systems may be quite high, but each system requires the users to be within a close range, generally 10 miles or less, of the system infrastructure. This infrastructure is extremely expensive, requiring hundreds of millions of dollars to build a nationwide network. It can sometimes be cost effective to build such infrastructure in areas of high population density, and indeed, roughly 90% of the United States population can be supported by such systems. It is simply not economical for providers of such services to install the required infrastructure in remote areas of low population density, however. In addition, local infrastructure may be subject to manmade or natural disasters.

Several satellite networks, both existing and proposed, have been designed to address the issue of poor geographic coverage. These satellite-based systems typically require a tremendous investment in infrastructure. The infrastructure is located in orbit where it cannot be installed, maintained or replaced without large expenditures for space-launch vehicles. In addition, the mobile subscriber devices required to communicate with such systems are relatively expensive. Furthermore, the field devices need to be within the line of sight of the satellite, since they must typically have overt, high gain electromagnetic reception devices such as dishes or long antennas. Such systems are thus impractical for certain applications.

An example is the problem faced by the manager of fleet vehicles. The assets for which the manager is responsible are highly mobile, and they can be located virtually anywhere. These assets are easily stolen and expensive to insure, and such assets can also become unproductive when it cannot be located or are out of communication ranges. Similar problems exist in other industries as well. For example, there is increasing pressure on the railroad industry to move towards scheduled service, to facilitate just-in-time delivery in an effort to better compete with the trucking industry. To achieve this goal, the manager of a railroad system would ideally be able to quickly determine the location of each and every rail car on a regular basis, no matter where the rail car is located. Optimum routing and delivery time may then be accurately predicted.

In such applications, it would be advantageous to be able to query a remote device in order to determine its status and location, but with minimum cost. Current cellular mobile service costs are increasing as the carriers move from 2G, 3G to 4G and 5G. In addition, higher data rates over limited capacity communications channels are increasing congestion, and transmissions are lost. Increasingly, basic machine-to-machine and emergency communications cell data services are becoming unreliable and more expensive.

Other industries, such as the trucking and shipping industries, struggle with the lack of the ability to track accurately and inexpensively the location of shipping containers no matter where they are located. Any one shipping container may hold thousands or potentially millions of dollars of valuable goods. Clearly, it would be advantageous to know where they are at all times.

Similar demands are made in remote meter or sensor reading, facility monitoring, security, buoy monitoring, and other applications. Applicants have recognized that while some needs of such application could be met by combining a position sensing device such as a Global Positioning System (GPS) receiver unit together with an existing two-way mobile data communication device such as a cellular or satellite transceiver, the system would nevertheless exhibit the aforementioned difficulties of high installation and operation cost, and be subject to the inability to operate in anything but a region of direct line of sight or close proximity to the system infrastructure.

SUMMARY

In view of the above, Applicants recognized a need for ubiquitous and more reliable wireless communication networks, systems, and methods of data communications of various types. Accordingly, embodiments of radio communication systems and associated methods, which allow for more efficient wide area data communications networks, such as by making use of a shortwave antenna sites for inbound links and a centralized controller for coordinating use of available and clear electromagnetic waves, among other features, are provided.

The embodiments of wireless systems and associated methods described herein are at least in part focused on needs for highly reliable two-way data communications that takes the form of short messaging between automated end points or user devices. Such systems are able to provide communication without local infrastructure over a wide geographic international area. Some of the systems, methods, and operational concepts described herein in U.S. Pat. Nos.

5,765,112, 5,734,963 and 5,640,442 may be utilized in the systems and methods described in the present disclosure. Embodiments of the systems and methods of the present disclosure overcome operational barriers that were not previously anticipated, as well as introduce additional layers of capability. The two-way wireless data communications system described herein efficiently provides ubiquitous connectivity through intelligent shortwave frequency management (ISFM). The physical configuration and basic operation of this shortwave communication system are described in U.S. Pat. Nos. 5,765,112 and 5,640,442.

The present disclosure also provides embodiments of a controlling network infrastructure that rapidly and virtually instantaneously gives instructions to, and requests data from, not only many remote field units distributed across the U.S., but also a linked network of distributed fixed antenna sites, to maximize the efficient use of channels in the 3 MHz to 30 MHz band. Shortwave transmissions, which are reflected back to the earth by the ionosphere, cover thousands of miles with no intermediate infrastructure. Thus, embodiments of the systems and methods described could be used worldwide.

BRIEF DESCRIPTION OF DRAWINGS

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

DETAILED DESCRIPTION

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions.

ISFM systems and associated methods as described in the present disclosure improve previous processes in the field such that more communication channels can be made available and greater quantities of data can be sent over fixed capacity allocations granted under Federal Communications Commission (FCC) shortwave licenses. The present processes also can correct inefficiencies and delays in the frequency utilization process, not just from a FCC compliance standpoint, but also from the standpoint of reducing the probability of another user transmitting on the same channel. Additionally, it defines a variety of ways that intelligently crafted operations and message structures can make optimum use of the bandwidth, time slots and power allocations granted by the FCC.

In various embodiments of the present disclosure, a two-way communication system includes a plurality of base stations, a network operations system, and one or more remote transceiver units. Each of the plurality of base stations is operable to scan a plurality of frequencies in a 3 Megahertz to 30 Megahertz frequency band to determine power and noise floor levels for each of the plurality of frequencies, determine whether a frequency of the plurality of frequencies meets a clear frequency criteria based on the power and noise floor levels of the frequency during at least two consecutive scans, determine whether the frequency meets a volatility criteria based on the power and noise floor levels of the frequency during multiple scans conducted within a time duration, and generate a set of frequencies that meet the clear frequency criteria and the volatility criteria. The network operations system is operable to coordinate the scanning of frequencies at the plurality of base stations, receive the sets of frequencies from the plurality of base stations, generate a list of frequencies available for transmitting data thereon from the sets of frequencies, and transmit the list of frequencies. The one or more remote transceiver unit is operable to receive the list of frequencies from the network operations system, select a frequency from the list of frequencies, and transmit data on the selected frequency. The list of frequencies may include times and frequencies at which the remote transceiver units can optimally transmit data and at which receive base stations can receive the data. In some embodiments, the plurality of scanned frequencies is a portion of a plurality of sampling frequencies in a 3 Megahertz to 30 Megahertz frequency band and the network operations system transmits the list of frequencies to the remote transceiver unit prior to all of the sampling frequencies being scanned and analyzed to reduce delay between analyzing a frequency and issuing the frequency for use. In some embodiments, the network operations system is operable to determine one or more frequencies on the list of frequencies not used by the remote receiver units within a time window and reissue the one or more frequencies to the remote receiver units.

A shortwave communication network is in communication with the network operations system and the plurality of receive base stations and the one or more remote transceiver units. The network operations system is operative to compute a protocol under which nationwide communications is to be completed via coordinated operations of at least one receive base station and at least one remote transceiver unit, determine a list of frequencies within at least portion of a 3 Megahertz to 30 Megahertz frequency band that meet a clear frequency criteria and a volatility criteria based on power and noise floor levels detected through a plurality of consecutive frequency scans, and transmit data packets to the remote transceiver units indicating times and frequencies at which the remote transceiver units can transmit data and at which receive base stations can receive the data. In some embodiments, each of the remote transceiver units records a time of arrival of a transmission from the network operations system and transmits the time of arrival to the network operations system to enable the network operations system to determine the approximate geo-location of each remote transceiver units. In some embodiments, all or a subset of the remote transceiver units are grouped together into a group based on geo-location, classification, function, or any combination thereof, and same or similar instructions are sent to all the remote transceiver units in the group.

In various embodiments, a method of configuring communications includes a) coordinating, at a network operations systems, scans of a plurality of frequencies in a 3 Megahertz to 30 Megahertz frequency band to be conducted at a plurality of receive base stations communicative with the network operations systems, b) scanning, at the plurality of receive base stations, the plurality of frequencies to determine power and noise floor levels for each of the plurality of frequencies, c) determining whether a frequency of the plurality of frequencies meets a clear frequency criteria based on the power and noise floor levels of the frequency during two consecutive scans, d) determining whether the frequency meets a volatility criteria based on the power and noise floor levels of the frequency during multiple scans conducted within a time duration, e) generating a list of frequencies that meet the clear frequency criteria and the volatility criteria, and f) transmitting the list of frequencies to one or more remote transceiver units.

In some embodiments, the method may further include removing, by each receive base stations, unauthorized or skipped frequencies from further analysis. In some embodiments, the method may further include distributing the list of frequencies into a plurality of data packets and transmitting the plurality of data packets as a continuous data stream. The plurality of scanned frequencies may be a a portion of a plurality of sampling frequencies in a 3 Megahertz to 30 Megahertz frequency band and the list of frequencies is transmitted prior to all of the sampling frequencies being scanned and analyzed. The method may further include determining one or more frequencies on the list of frequencies not used by the one or more remote receiver units and reissuing the one or more frequencies to the one or more remote receiver units. The method may also further include selecting, by at least one of the one or more remote receiver units, a selected frequency from the list of frequencies and transmitting a message in a message data packet on the selected frequency, the message data packet having one of a plurality of data sizes, the plurality of data sizes incrementing by six bytes.

In some embodiments, determining whether the frequency meets the volatility criteria may include scanning the frequency a plurality of times during the time duration, determining the power level and noise floor level of the frequency for each scan, designating the frequency as clear or not clear for each scan based on whether the power level is higher than the noise floor level for the respective scan, determining a number of times the frequency changes between being clear and not clear during two consecutive scans of the plurality of scans, and determining whether the frequency meets the volatility criteria based on whether the number of times is higher than a threshold number.

Figure 1:
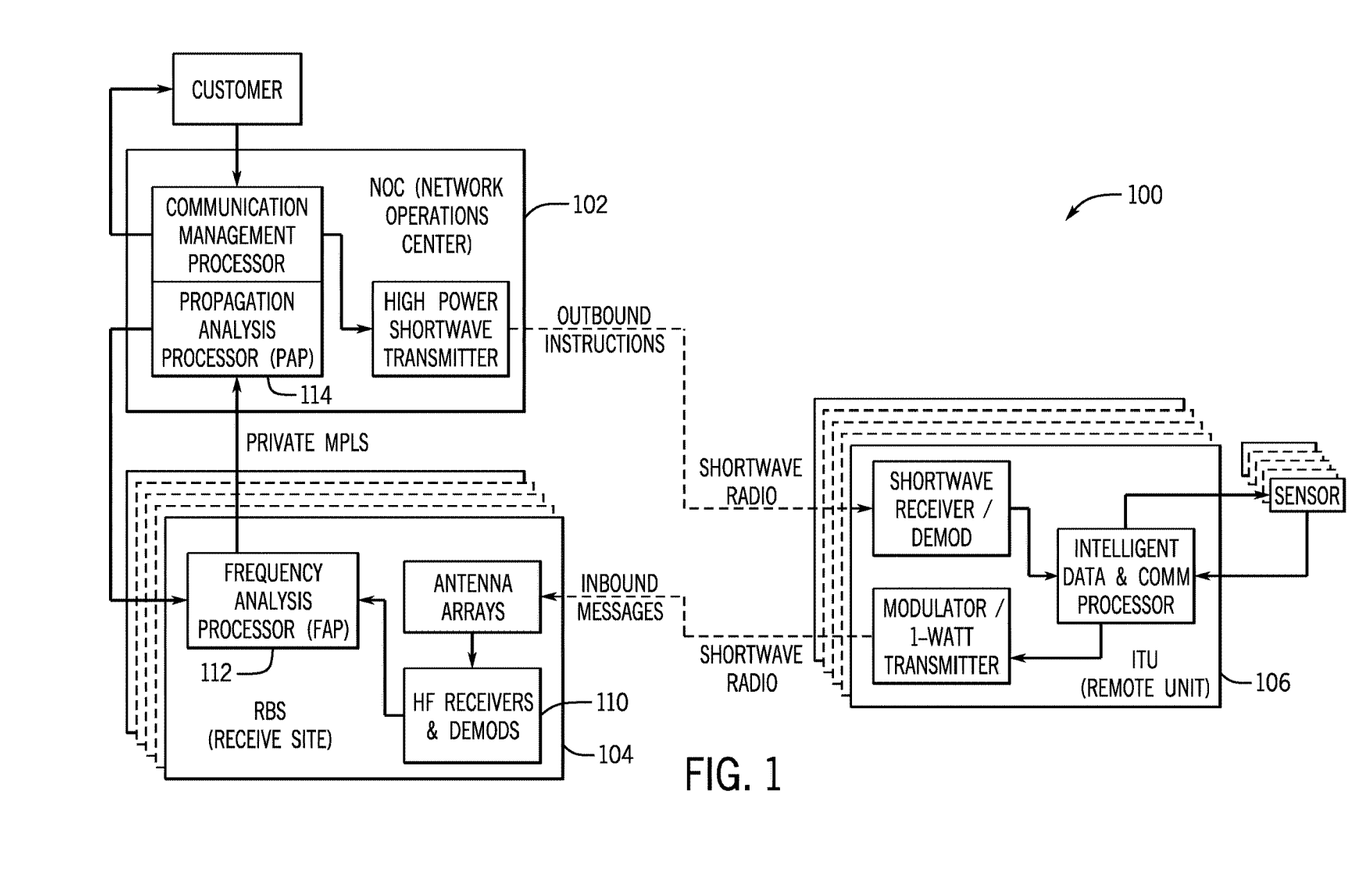
FIG. 1 is a block diagram of a two-way shortwave radio communication network, in accordance with example embodiments of the disclosure.
Figure 2:
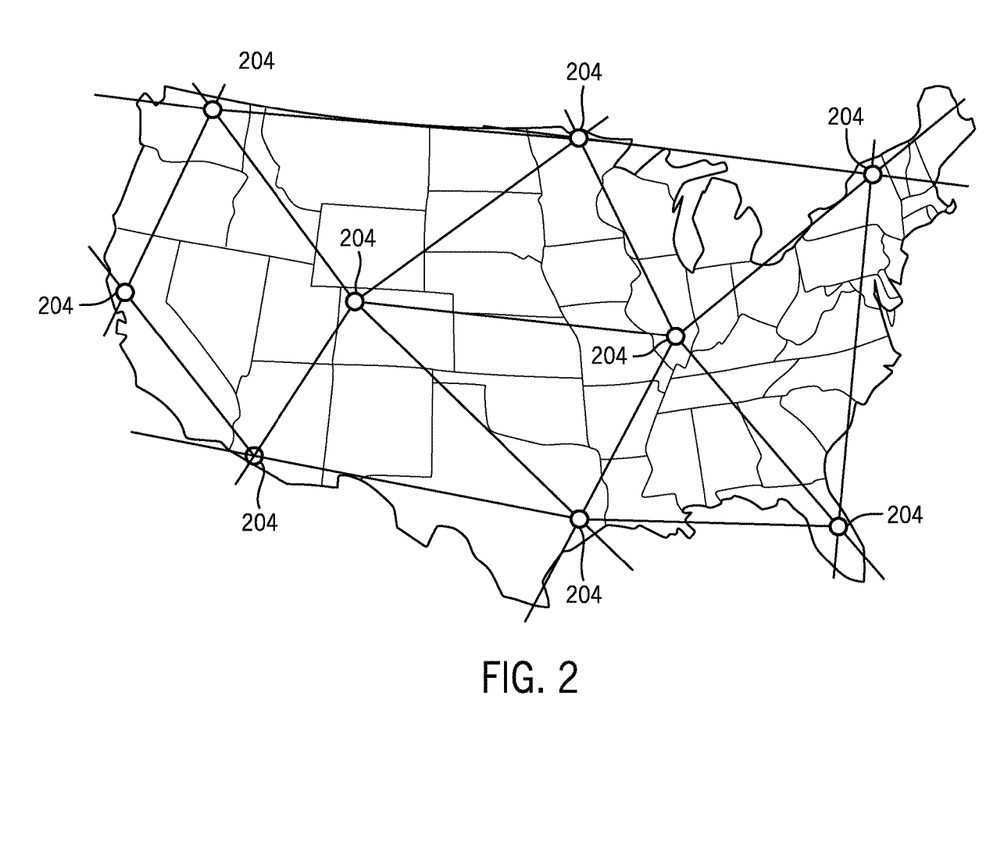
FIG. 2 illustrates typical locations for fixed receive sites across the United States, in accordance with example embodiments of the disclosure.
Figure 3:
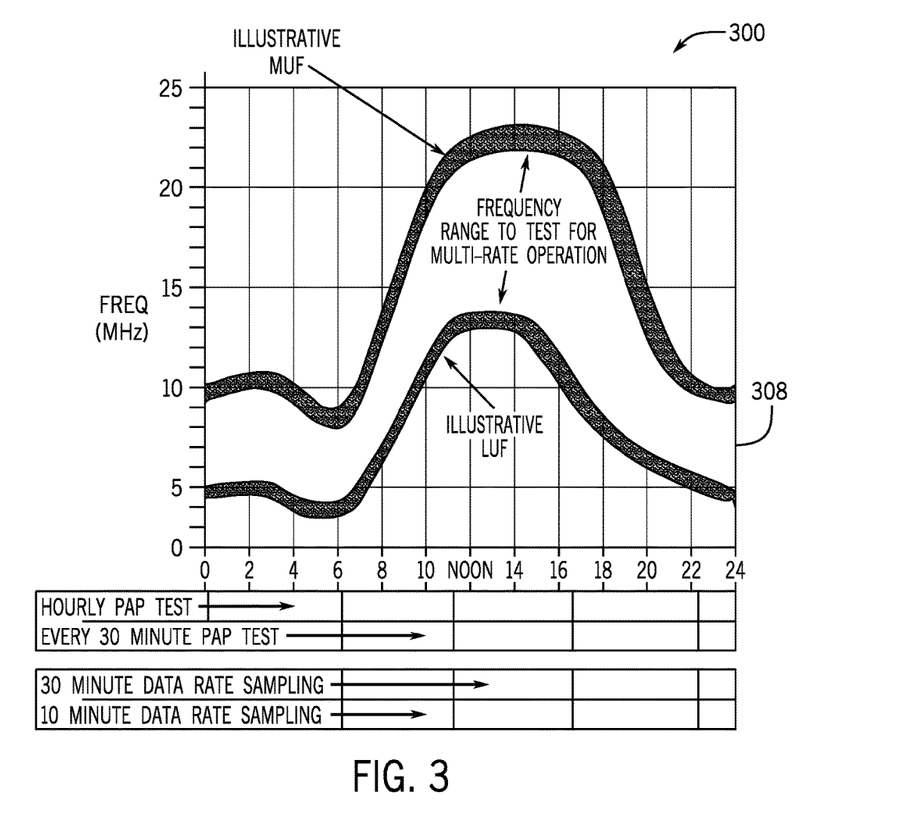
FIG. 3 illustrates a normal profile of propagating channels that an ISFM protocol uses to select optimum channels for immediate communications, in accordance with example embodiments of the disclosure.

The figures and descriptions presented below provide examples of various embodiments of the present application. FIG. 1 is a block diagram of a two-way shortwave radio communication network 100, in accordance with example embodiments of the disclosure. In one or more embodiments, remote units 106, or remote assets, communicate over a shortwave link to a network operations center (NOC) 102 via one or more remote base stations (RBS) 104. FIG. 2 illustrates typical locations for fixed receive sites 204 across the United States, in accordance with example embodiments of the disclosure. To efficiently use the assigned spectrum, the system defines shortwave frequency channels that not only propagate as shown in FIG. 3, but also have been declared clear by an occupancy assessment technique. FIG. 3 illustrates a normal profile 300 of propagating channels 308 that an ISFM protocol or process uses to select optimum channels for immediate communications, in accordance with example embodiments of the disclosure.

Receivers 110 at each RBS 104 site scan the 3 MHz to 30 MHz band, and send the information to the frequency analysis processor (FAP) 112, which evaluates those channels and chooses the ones with no discernible transmissions/receptions and thereby declares them as clear channels. Upon receiving clear channel data from the RBS sites 104, a propagation analysis processor (PAP) 114 analyzes clear channels against allocated bands, propagation probabilities and a sectored coverage map, and issues an optimized frequency list to be used for transmissions by remote assets. The method of performing assessment of clear channels can be broken up into the following major steps of frequency scanning, noise floor calculation, clear frequency assessment, and exclusion of volatile frequencies. Each of these steps is described further below.

Figure 4:
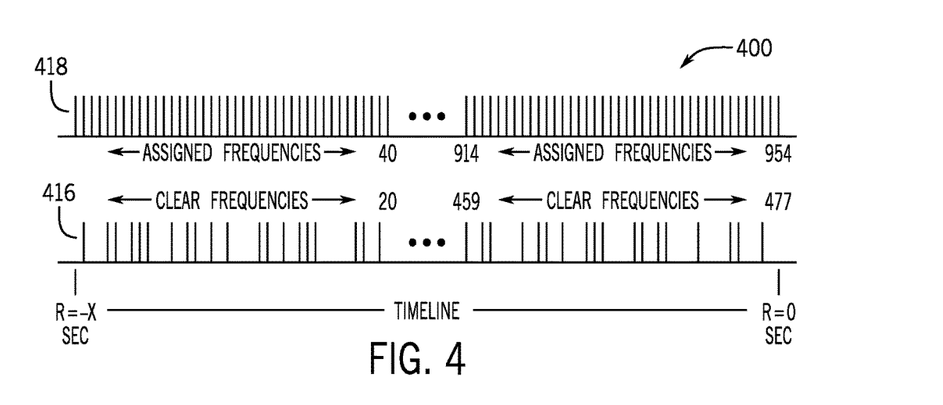
FIG. 4 illustrates results of a clear frequency analysis, in which unused shortwave channels are isolated for further analysis and potential issuance as remote initiated frequencies (RIF) to remote units (ITU), in accordance with example embodiments of the disclosure.

Each RBS 104 FAP 112 is equipped with one or more receivers 110 capable of scanning the shortwave spectrum from 3 to 30 MHz within a few seconds, collecting the frequency and radio frequency power level in pre-determined bins. The scan at each RBS 104 is timed and coordinated by the NOC 102. In addition, the FAP 112 at each RBS 104 automatically removes unauthorized or skipped frequency bands from any further analysis by the FAP 112. An embodiment of this process 400 is illustrated in FIG. 4, in which clear frequencies 416 are selected from scanning a range of assigned frequencies 418.

Figure 5:
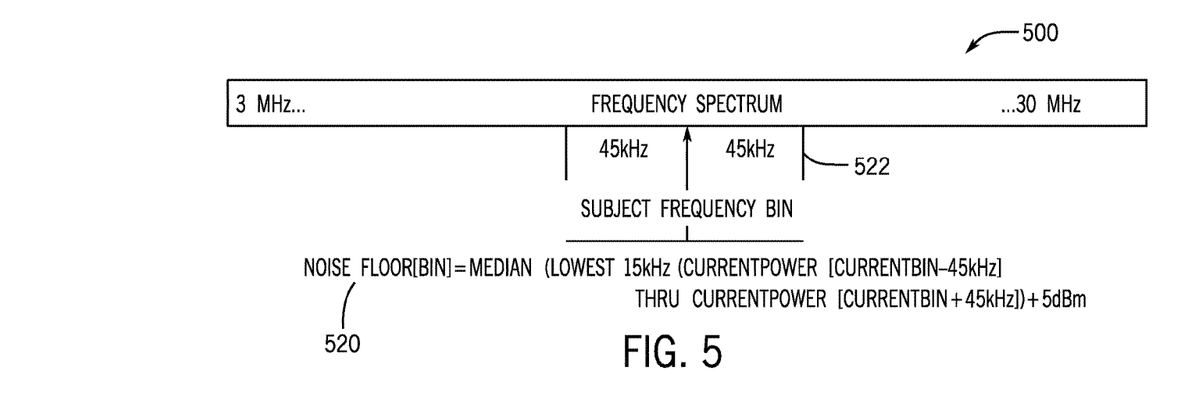
FIG. 5 illustrates a process by which a noise floor calculation is made, and by which the quietest channels are issued to remote units, in accordance with example embodiments of the disclosure.

Referring to FIG. 5, which illustrates calculation of noise floor, when calculating the noise floor 520 for a given frequency 522, the current power level is defined as the median of the current scanned power level and the two previously collected scan levels. The result can be used as an example of an evaluation algorithm that favors leaving an apparent occupied channel in a previous state for at least one scan in order to determine if the variation was anomalous. Using newly derived current power levels for each group of frequencies, the FAP 112 establishes a conservative noise floor 520 by measuring noise power levels 45 kHz to either side of the subject frequency, computing an interim noise floor for the selected frequency by taking median power levels of it and the surrounding frequencies, then adding 5 dBm to the interim noise floor to establish a conservative noise floor.

Given the above scanned power levels and computed noise floor for each channel, the derivation of clear frequencies becomes a simple comparison of the scanned power and the noise floor. In one or more embodiments, the FAP 112 determines the clear state for each of the frequency groups by determining if the scanned power level for the group is lower than the computed noise floor level. A channel is determined to be clear for this scan if this condition is true. In one or more embodiments, however, being clear for one scan is not sufficient for the system to declare the frequency clear for use. For a frequency bin 522 to be declared clear for remote asset use, the frequency must remain in a clear state for three consecutive scans of that frequency bin.

At the conclusion of the channel assessment sequence, the FAP 112 has developed a list of frequencies that have been clear for three consecutive scans and have met the volatility criteria. This list of clear frequencies (called "remote initiated frequencies" or RIF) is forwarded to the NOC 102, which correlates data from multiple RBS sites 104. The NOC 102 also may perform a propagation analysis and issue a stream of clear and propagating frequencies over an outbound communications link.

An example of one of the goals of processes described in the present disclosure is to predict, as accurately as possible, that a clear frequency will remain clear for at least as long as it takes to transmit a message. In order to facilitate this goal, the volatility of each frequency is established. Volatility of a frequency is defined as an index representing the number of transitions between clear and unclear for each given scan relative to its previous scans. Volatility in the system is maintained on a frequency for a sliding one-minute window. In one or more embodiments, if a frequency changes between clear and in-use or in-use and clear in excess of a pre-determined threshold within the one minute time window, then the frequency is considered to be too volatile and is excluded from the clear frequency list sent to the NOC 102.

Figure 6:
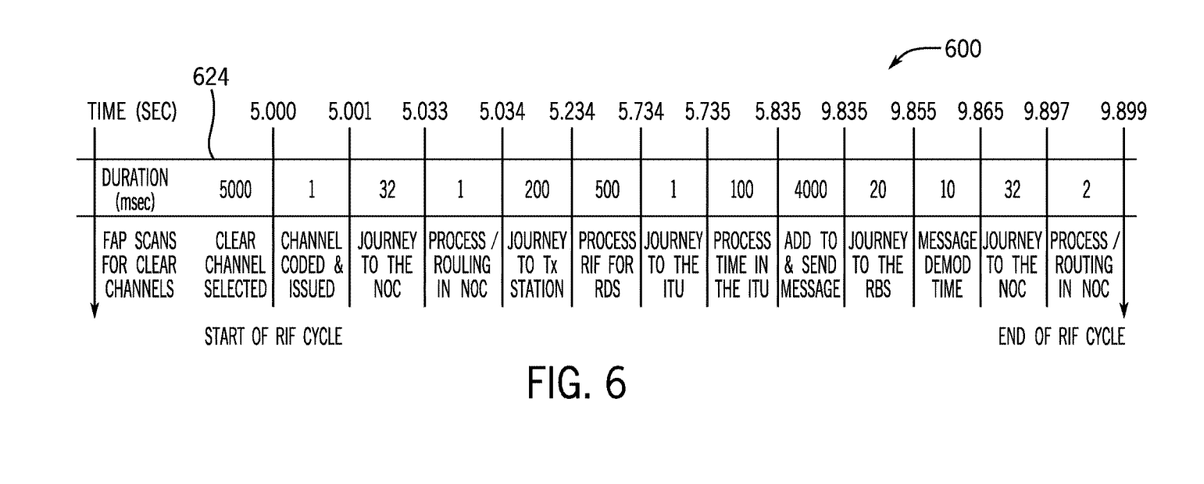
FIG. 6 illustrates a process used in prior art to allocate, assign and issue operating frequencies to remote units.

The duration and efficiency of any proposed clear frequency scanning process is influenced by the activities and intervals that make up the overall shortwave band evaluation process. FIG. 6 illustrates a timeline 600 for the creation, distribution, reception, and use of a RIF when used with a 4-second message under the previous techniques. Under previous methods, as illustrated, the FAP 112 scanning process 624 operated on a 5-second interval. That is, it took the FAP 112 about 5 seconds to scan the assigned shortwave frequency band and record the results. Then, in conjunction with the PAP 114 filtering and distribution process, the FAP 112 would issue a new block of clear and propagating frequencies every 10 seconds. The PAP 114 meters out frequencies such that a continuous stream is available until the next block of clear frequencies arrives from the FAP 112. Once issued by the PAP 114, these RIFs traverse the internet and enter the outbound communication processor. The ITU 106 then receives the data, selects a RIF, tunes the antenna to a predetermined setting and broadcasts a message. This clear-and-propagating frequency sampling process adds significant delay (latency) to those frequencies that fall into the early part of a scanning cycle. By the time data from the third scan is packaged and sent to the NOC 102, the lowest frequencies could be over 8 seconds old. The chance of another user interfering with transmissions increases with every second from the time the channel is evaluated until the time the message is completed. So it is advantageous to find a way of reducing the overall delay.

Figure 7:
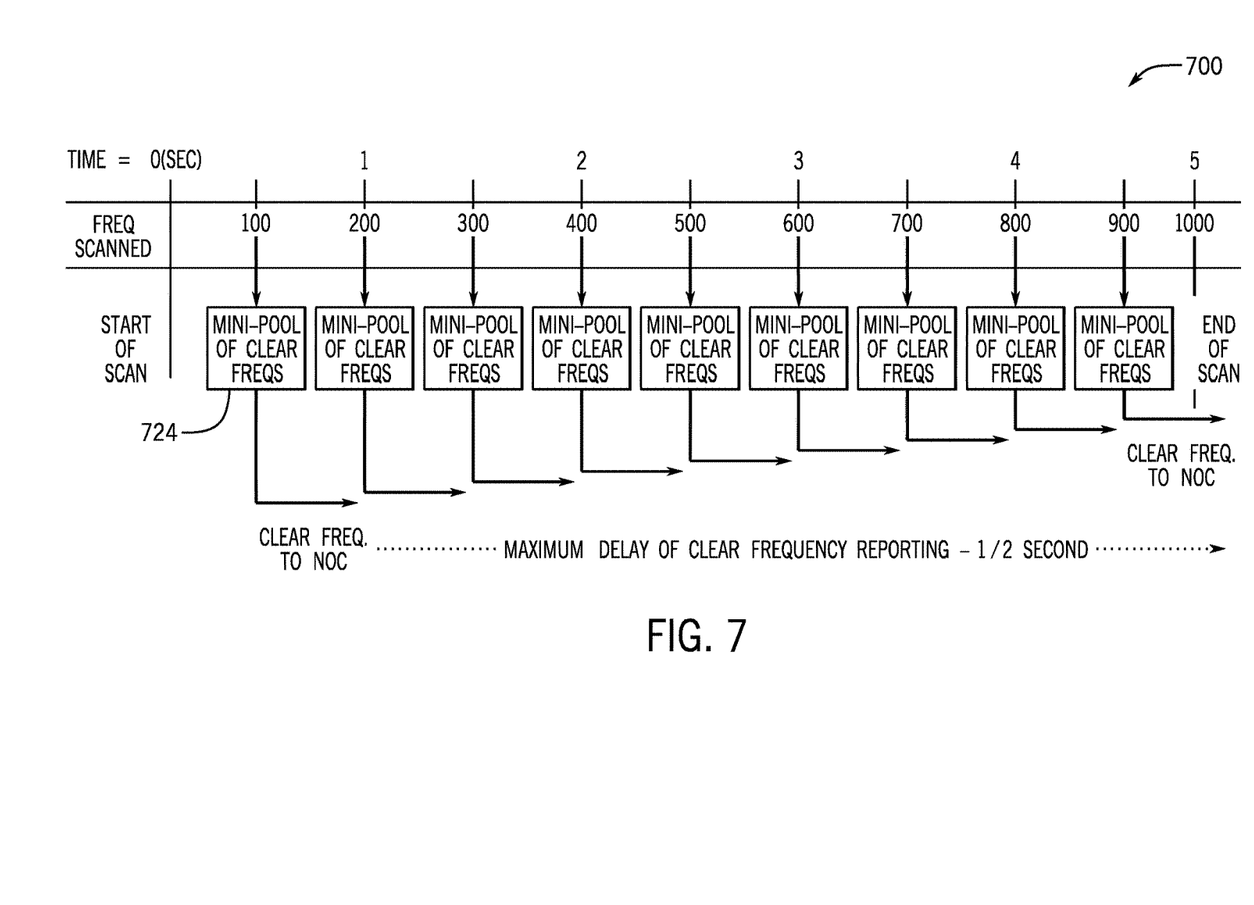
FIG. 7 illustrates an improved frequency allocation process that allows more frequencies to be issued from a reserve pool in any given interval of time, in accordance with example embodiments of the disclosure.

FIG. 7 illustrates a process of clear frequency reporting 700 under the present disclosure, which provides an improved way to minimize delay, maximize the use of clear frequencies, and increase the RIF rate. Specifically, the process includes sending small packets 724 of clear frequencies as they are observed, rather than waiting for the full band to be scanned and evaluated. Thus, the time delay between scanning and sending of a clear frequency is reduced.

Figure 8:
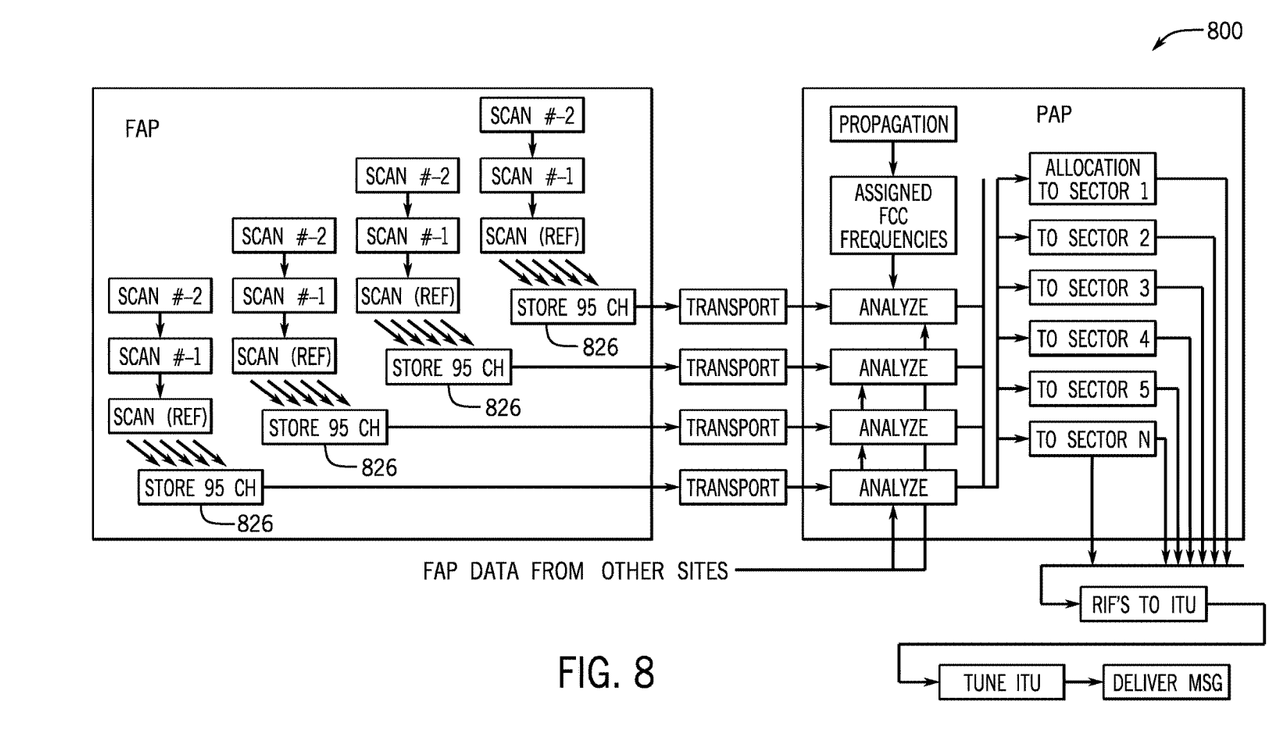
FIG. 8 is a detailed flowchart that illustrates the efficient issuance, monitoring, and ultimate success rate of the intelligent frequency allocation process, in accordance with example embodiments of the disclosure.

FIG. 8 is a flowchart 800 that illustrates the efficient issuance, monitoring, and ultimate success rate of the intelligent frequency allocation process. Instead of collecting sampled frequencies in a 5-second bin and shipping the entire packet as an integral unit, embodiments as described in this disclosure have clear channels gathered in incremental buckets 826. For example, if 954 frequencies are scanned in 5 seconds, about 95 frequencies are sampled every half second. If these are issued to the NOC 102 as they are gathered, the delay of the earliest sampled frequencies is reduced by 4.5 seconds. This significantly reduces the probability of a collision with another user's transmission.

As an additional advantage, for example, the incremental scanning scenario allows enough time for RIFs to be reissued, and frequencies to be reused, within an allocated window. Thus, if the NOC 102 issues a RIF and receives no response on that RIF for more than 2.2 seconds, it means that the RIF was not used by any remote unit and therefore, because of a 10 second utilization window, can instantly be reissued without waiting for the results of a new scan. If an ITU 106 does not use this second announcement, the RIF can be used a third time. This process, in essence, increases the size of the RIF pool and allows a more continuous flow of RIFs during limited bandwidth times of the day, year, or sunspot cycle. This may be particularly advantageous if a system was heavily loaded and the capacity needed to be increased.

Capacity could be further enhanced by polling unmanned or non-critical units within a small, predetermined window in time, or by allowing a significant latency (e.g., a one-hour minimum) for non-critical units. In this improved operation, the 4-second message delivery time can be shortened, and the number of frequency reissuing cycles increased by raising the data rate and/or reducing the effective overhead load.

Under the system operating under previous techniques, all message sizes are defined by a pre-determined protocol that says they must be 12, 30, 36, 48, and 60 bytes. There is nothing in between. If a message requires only 13 bytes, under the present message structure, a 30-byte packet is sent which is only 54.2 percent efficient. In this example, 45% of the capacity is wasted. Thus, it is apparent that significant capacity can be lost by inefficient message formatting. Although there may be advantages to have certain packet sizes, having these packet sizes increase in smaller steps can save significant capacity. This is particularly evident from the 12 and 30 byte examples. Under the techniques of the present disclosure, particularly sizes in 6 byte or 4 byte increments rather than the current 12 byte increments are utilized.

Figure 9:
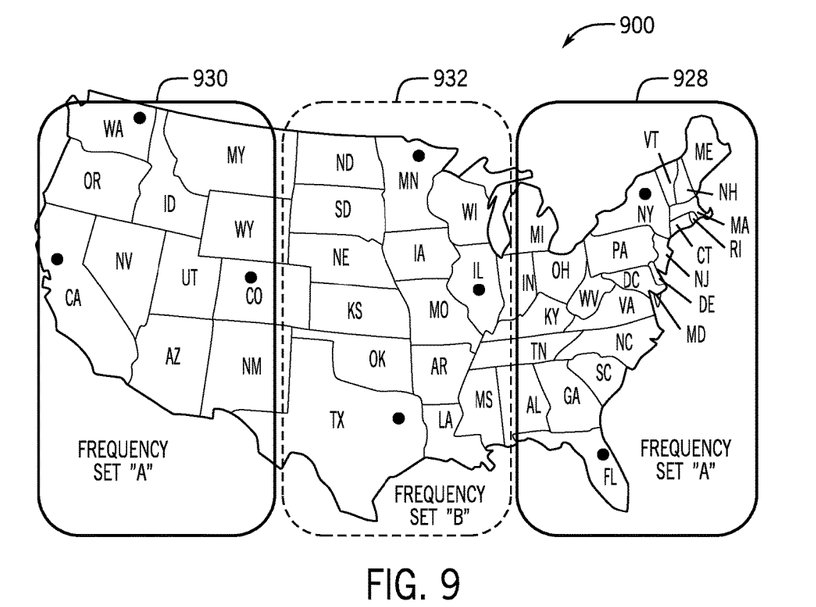
FIG. 9 is a map of the continental United States illustrating how it is partitioned when RIF are managed to allow simultaneous frequency utilization, in which two or more messages are sent over the same shortwave channel in the same time slot, in accordance with example embodiments of the disclosure.

The reuse of RIFs adds an additional capacity advantage. In one or more embodiments, the system accommodates the duplicate use of frequencies by modifying PAP software, and increasing the number of receivers. FIG. 9 is a map partitioned to illustrate an example of simultaneous frequency utilization. As an example, referring to FIG. 9, for Operations in the United States, such a technique makes it feasible for the East Coast 928 to simultaneously use the same frequencies as the West Coast 930, which, ideally, doubles the number of available channels for those two regions. Because the Midwest 932 needs its own set of RIFs, however, the multiplication factor is less than two, depending upon the algorithm used to select frequencies for reuse. A conceptual illustration of how the reuse of RIFs might be implemented is shown below where the continental United States is divided into three principal sectors: one for the East 928, one for the West 930, and another for the Midwest 932.

Figure 10:
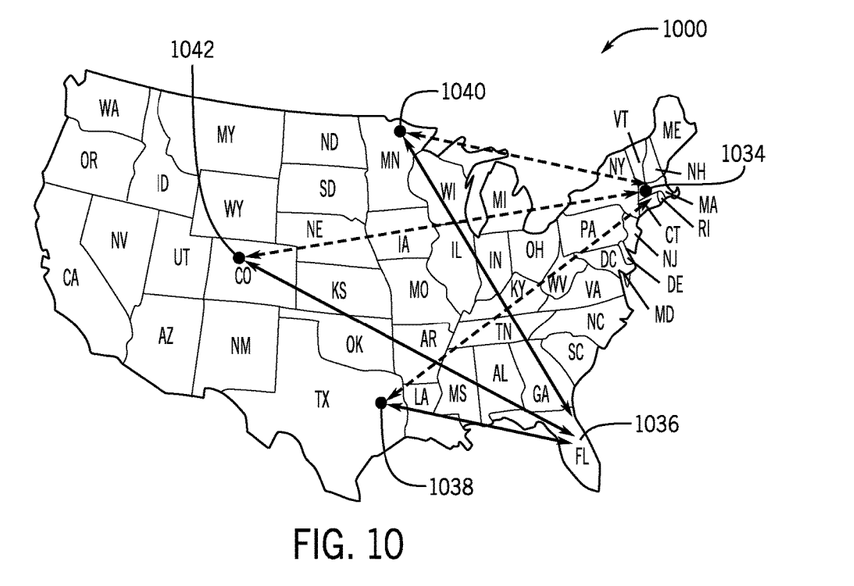
FIG. 10 illustrates how receive site antenna array beam directivity is used to simultaneous send two or more messages over the same shortwave channel in the same time slot, in accordance with example embodiments of the disclosure.

While frequency reuse can be applied on a region-by-region basis, as discussed above, another process for frequency reuse, for example, can be implemented on a sector/beam/propagation basis. Specifically, the beams and sectors can be used as the separator as opposed to the region. For example, as illustrated in FIG. 10, Massachusetts 1034 and Florida 1036 can be used as separable regions just like East and West. In this example application, a given frequency is assigned to beams at the Texas 1038, Minnesota 1040, and Colorado 1042 sites that point to the Florida sector 1036, while the same frequency is simultaneously assigned to different beams at the Texas 1038, Minnesota 1040, and Colorado 1042 sites that point to the Massachusetts sector 1034. Thus, a similar set of RIFs are issued via the outbound link to both the Massachusetts sector 1034 and the Florida sector 1036, while receivers on the respective RBS beams are tuned to correspond to the issued RIFs.

In one or more embodiments, whenever and wherever a channel is propagating in the USA, a RIF is sent to any and all sectors, providing there are enough receivers on enough beams to cover any message that might be returned by an ITU 106 from that sector and on that frequency. Wherever an RBS receiver/beam clearly picks up a message on that frequency, it is forwarded to the NOC 102, even if other RBS 104 receivers/beams pick up other messages, whether from north-south or east-west redundancies. Since the upgraded NOC 102 can distinguish between different same-time messages from different sectors and sources, the concept of frequency reuse is put to advantage. In addition, the full disclosure of U.S. Pat. Nos. 5,765,112, 5,734,963 and 5,640,442 are hereby incorporated herein by reference in their entirety.

This application is related to, and claims the benefit of, U.S. Provisional Application No. 62/458,962, filed Feb. 14, 2017, titled "Intelligent Shortwave Frequency Management Systems and Associated Methods," which is incorporated herein by reference in its entirety.

The foregoing disclosure and description of the disclosed embodiments is illustrative and explanatory of the embodiments of the invention. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A wireless data communication system, the system comprising:
   a plurality of base stations, each of the plurality of base stations operable to scan a plurality of frequencies in a 3 Megahertz to 30 Megahertz frequency band to determine power and noise floor levels for each of the plurality of frequencies, determine whether a frequency of the plurality of frequencies meets a clear frequency criteria based on the power and noise floor levels of the frequency during at least two consecutive scans, determine whether the frequency meets a volatility criteria based on the power and noise floor levels of the frequency during multiple scans conducted within a time duration, and generate a set of frequencies that meet the clear frequency criteria and the volatility criteria;
   a network operations system operable to coordinate the scanning of frequencies at the plurality of base stations, receive the sets of frequencies from the plurality of base stations, generate a list of frequencies available for transmitting data thereon from the sets of frequencies, and transmit the list of frequencies; and
   a remote transceiver unit operable to receive the list of frequencies from the network operations system, select a frequency from the list of frequencies, and transmit data on the selected frequency.

2. The system of claim 1, wherein the each of the plurality of base stations is further operable to scan the frequency a plurality of times during the time duration, determine the power level and noise floor level of the frequency for each scan, designate the frequency as clear or not clear for each scan based on whether the power level is higher than the noise floor level for the respective scan, determine a number of times the frequency changes between being clear and not clear during two consecutive scans of the plurality of scans, and determine whether the frequency meets the volatility criteria based on whether the number of times is higher than a threshold number.

3. The system of claim 1, wherein the list of frequencies includes times and frequencies at which the remote transceiver units can optimally transmit data and at which receive base stations can receive the data.

4. The system of claim 1, wherein the plurality of scanned frequencies is a portion of a plurality of sampling frequencies in a 3 Megahertz to 30 Megahertz frequency band and the network operations system transmits the list of frequencies to the remote transceiver unit prior to all of the sampling frequencies being scanned and analyzed to reduce delay between analyzing a frequency and issuing the frequency for use.

5. The system of claim 1, wherein the network operations system is operable to determine one or more frequencies on the list of frequencies not used by the remote receiver units within a time window and reissue the one or more frequencies to the remote receiver units.

6. A two-way wireless data communication system, the system comprising:
a network operations system;
a plurality of receive base stations in communications with the network operations system; and
a shortwave communication network in communication with the network operations system and the plurality of receive base stations and including a plurality of remote transceiver units, the network operations system being operative to compute a protocol under which nationwide communications is to be completed via coordinated operations of at least one receive base station and at least one remote transceiver unit, determine a list of frequencies within at least portion of a 3 Megahertz to 30 Megahertz frequency band that meet a clear frequency criteria and a volatility criteria based on power and noise floor levels detected through a plurality of consecutive frequency scans, and transmit data packets to the remote transceiver units indicating times and frequencies at which the remote transceiver units can transmit data and at which receive base stations can receive the data.

7. The system of claim 6, wherein each of the plurality of remote transceiver units records a time of arrival of a transmission from the network operations system and transmits the time of arrival to the network operations system to enable the network operations system to determine the approximate geo-location of each remote transceiver units.

8. The system of claim 6, wherein all or a subset of the plurality of remote transceiver units are grouped together into a group based on geo-location, classification, function, or any combination thereof, and same or similar instructions are sent to all the remote transceiver units in the group.

9. The system of claim 6, wherein each of the plurality of receive base stations is operable to scan a plurality of frequencies in a 3 Megahertz to 30 Megahertz to determine power and noise floor levels for each of the plurality of frequencies.

10. The system of claim 9, wherein each of the plurality of receive base stations is operable to determine whether a frequency of the plurality of frequencies meets the clear frequency criteria based on the power and noise floor levels of the frequency during at least two consecutive scans.

11. The system of claim 9, wherein each of the plurality of receive base stations is operable to determine whether the frequency meets the volatility criteria based on the power and noise floor levels of the frequency during multiple scans conducted within a time duration.

12. The system of claim 6, wherein times and frequencies at which the remote transceiver units can transmit data and at which receive base stations can receive the data are transmitted as a continuous data stream to reduce delay between analyzing a frequency and issuing the frequency for use.

13. The system of claim 6, wherein one or more frequencies on the list of frequencies not used by the one or more remote transceiver units within a time window are reissued to use by the network operations system.

14. A computer-implemented method comprising:
coordinating, at a network operations systems, scans of a plurality of frequencies in a 3 Megahertz to 30 Megahertz frequency band to be conducted at a plurality of receive base stations communicative with the network operations systems;
scanning, at the plurality of receive base stations, the plurality of frequencies to determine power and noise floor levels for each of the plurality of frequencies;
determining whether a frequency of the plurality of frequencies meets a clear frequency criteria based on the power and noise floor levels of the frequency during two consecutive scans;
determining whether the frequency meets a volatility criteria based on the power and noise floor levels of the frequency during multiple scans conducted within a time duration;
generating a list of frequencies that meet the clear frequency criteria and the volatility criteria; and
transmitting the list of frequencies to one or more remote transceiver units.

15. The computer-implemented method of claim 14, further comprising:
removing, by each receive base stations, unauthorized or skipped frequencies from further analysis.

16. The computer-implemented method of claim 14, further comprising:
scanning the frequency a plurality of times during the time duration;
determining the power level and noise floor level of the frequency for each scan;
designating the frequency as clear or not clear for each scan based on whether the power level is higher than the noise floor level for the respective scan;
determining a number of times the frequency changes between being clear and not clear during two consecutive scans of the plurality of scans; and
determining whether the frequency meets the volatility criteria based on whether the number of times is higher than a threshold number.

17. The computer-implemented method of claim 14, further comprising:
distributing the list of frequencies into a plurality of data packets; and
transmitting the plurality of data packets as a continuous data stream.

18. The computer-implemented method of claim 14, wherein the plurality of scanned frequencies is a portion of a plurality of sampling frequencies in a 3 Megahertz to 30 Megahertz frequency band and the list of frequencies is transmitted prior to all of the sampling frequencies being scanned and analyzed.

19. The computer-implemented method of claim 14, further comprising:
determining one or more frequencies on the list of frequencies not used by the one or more remote receiver units; and
reissuing the one or more frequencies to the one or more remote receiver units.

20. The computer-implemented method of claim 14, further comprising:
selecting, by at least one of the one or more remote receiver units, a selected frequency from the list of frequencies; and
transmitting a message in a message data packet on the selected frequency, the message data packet having one of a plurality of data sizes, the plurality of data sizes incrementing by six bytes.

* * * * *